UNITED STATES PATENT OFFICE.

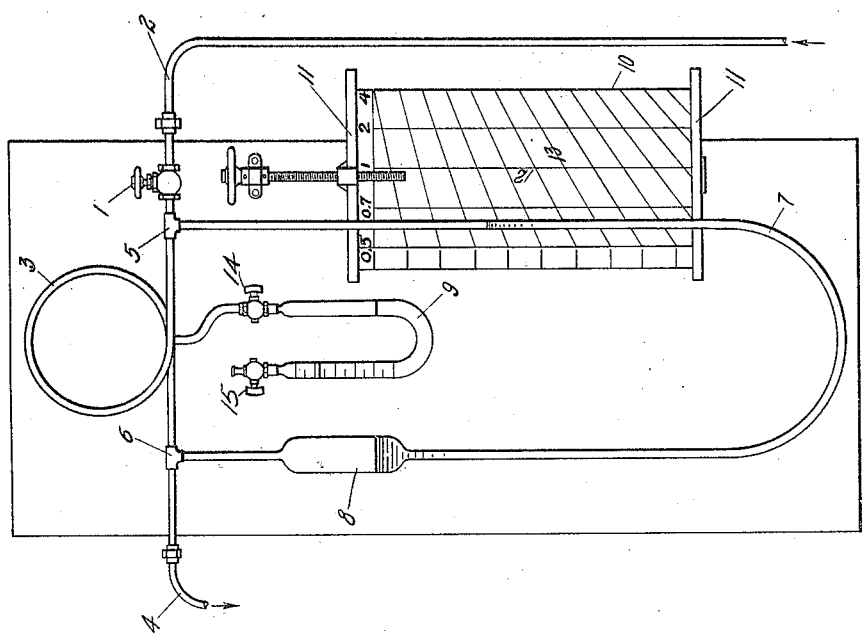

THEODORE HORTON, OF ALBANY, NEW YORK.

GAS METER.

1,423,217.   Specification of Letters Patent.   Patented July 18, 1922.

Application filed June 9, 1919, Serial No. 302,712. Renewed December 21, 1921. Serial No. 524,013.

*To all whom it may concern:*

Be it known that I, THEODORE HORTON, a citizen of the United States of America, residing at the city of Albany, in the county of Albany and State of New York, have invented certain new and useful Improvements in Gas Meters, of which the following is a specification.

My invention relates to gas meters, and the object of my invention is to provide an efficient, practical and inexpensive apparatus for measuring the quantity of gas flowing per unit of time through a tube.

I accomplish this object by means of the apparatus illustrated in the accompanying drawing, in which the figure is an elevation of my device.

Referring to the drawing, 1, is a valve adapted to control the flow of gas from the pipe line 2, leading from a source of supply (not shown).

After passing the valve, 1, the gas is conducted through a tube, 3, of uniform internal diameter throughout and preferably arranged in the form of a coil, and is then discharged into the pipe line, 4.

A differential manometer 7 is connected into the tube, 3, at the points, 5 and 6. For this differential manometer, I preferably use a U-tube of the ordinary type, except that a section of one leg is enlarged, as shown at 8 in the drawing. I do not wish to limit myself to the use of a U-tube type of differential manometer, since any type of differential manometer may be used.

Midway between the points, 5 and 6, I connect into the tube, 3, a gauge or other manometer, 9, which is provided with a three-way cock, 14, and a two-way cock, 15. These two cocks may be so turned as to shut off the connection from the coiled pipe, 3, and at the same time admit outside air to both legs of the manometer 9, thus releasing any excess pressure and equalizing the pressure in both legs; or these cocks may be so turned as to seal both legs against the outside atmosphere and at the same time admit the pressure from coiled pipe, 3, into the manometer through the cock, 14, and through the compression of the atmosphere. The rise of liquid in the closed compression leg of the manometer will permit the density of the gas in the coiled tube, 3, in terms of free atmosphere, to be indicated by a suitably divided scale on the closed compression leg of the manometer.

As for any constant temperature of a gas, its density will be proportional to its pressure, and as the temperature under which the apparatus would ordinarily work would vary, or could be regulated to vary, within such comparatively small limits as to be negligible, it is apparent that the scale on the manometer, 9, connected with the tube, 3, midway between the points, 5 and 6, may be graduated so as to give the average pressure of the gas in the tube, 3, corresponding to this approximately constant temperature. This scale may also be divided to read pressures in pounds per square inch, or head of water in feet, corresponding to these densities.

The chart, 10, bearing indicia coordinated with the graduations on the gauges or manometers, 7, and 9, I prefer to mount slidable in a horizontal direction in the chart holding frame 11, mounted behind the measuring leg of the U-tube, 7. The frame, 11, being adjustable vertically.

I do not wish to limit myself to the particular method shown for mounting the chart, as any method which provides for both vertical and horizontal adjustment would be workable.

The chart, 10, is provided with vertical lines, 12, numbered to correspond to the densities which may be read on the manometer, 9, and with inclined lines, 13, corresponding to quantities of gas in terms of weights or of volumes of free gas at atmospheric pressure, flowing per unit of time through the apparatus.

The laws governing the flow of air through pipes and those governing the flow of gases are so similar that for the purpose of explaining the operation of my invention they may be considered as identical, and the following well-known formula for the flow of air through pipes or tubes may be used as a basis for such explanation:

$$V = c\sqrt{\frac{frd^5}{L}},$$

in which—

V = Volume of free air (i. e., air at atmospheric pressure) passing through the pipe per unit of time.

$c$ = A constant determined by experiment.

$f$ = Loss of pressure in the pipe due to friction in length "L".

$r$ = average absolute pressure of gas in the pipe, between the connections 5 and 6, divided by the normal atmospheric pressure.

$d$ = Internal diameter of pipe.

$L$ = Length of pipe.

According to the formula, if a gas or a mixture, such as air, be passed through a tube or pipe of uniform diameter, "$d$", a distance, "$L$", the volume of flow "$V$", will vary.

The device shown and described may be used to measure the volume of free gas or its weight flowing through the device from the pipe line, 2, into the pipe line, 4, per unit of time, as follows:

With the valve, 1, closed, the zero on the chart, 10, is set opposite the zero point of the manometer, 7, which is at the surface of the liquid in the measuring leg of the U-tube when the pressure in the two legs are equal, by adjusting the vertical position of the frame, 11.

The valve, 1, is then opened, allowing gas from the pipe line, 2, to enter the device and passing through the coiled tube, 3, to enter the pipe line, 4.

The cock, 14, which has been previously set to close the flow of gas from coiled tube, 3, and admit outside atmosphere to one leg of the manometer, 9, and cock, 15, which has been previously set to admit outside atmosphere to the other leg of the manometer, 9, are then turned so as to seal off the outside atmosphere and admit gas from the coiled tube, 3, into the manometer, 9, thereby indicating its pressure and density (in terms of free atmospheres) on the scale of the manometer, 9.

The chart, 10, is now moved horizontally in its frame, 11, until the vertical line corresponding to the density read on the manometer, 9, is brought directly behind the edge of the measuring leg of the U-tube, 7.

Owing to the drop in pressure between the points, 5 and 6, due to friction in the pipe, 3, the liquid in the measuring leg of the manometer, 7, will now be correspondingly depressed below the zero point before mentioned. If the U-tube with enlarged sections, 8, is used, the level of the liquid in said enlarged section will remain practically constant, corresponding to the horizontal zero line on chart, 10. Thus the differential movement in the two legs of the U-tube corresponding to the drop in pressure between points, 5 and 6, will occur substantially only in the measuring leg of the manometer, 7. Furthermore, the enlarged section, 8, will tend to prevent the liquid in the U-tube from being forced out of said tube in case of an accidental sudden opening of the valve, 1.

The volume or weight of free gas passing through the pipe, 3, per unit of time will be that corresponding to the inclined line intersecting the before mentioned vertical line lying directly behind the edge of the measuring leg of the manometer, 7, opposite the surface of the liquid in said measuring leg, and may thus be read directly or, if necessary, by interpolation between said inclined lines.

What I claim as my invention and desire to secure by Letters Patent is:

1. In a device for measuring the quantity of gases flowing, per unit of time, through a tube, a tube of uniform internal diameter; a differential manometer connected into said tube at two points distant from each other; a manometer connected into said tube midway between said points; and a chart mounted to cooperate with the measuring leg of said differential manometer, and having thereon indicia showing the quantity of gas discharged for different pressures, said chart being adjustable to bring its indications into harmony with the pressures as shown by the midway-connected gage.

2. In a device for measuring the quantity of gases flowing, per unit of time, through a tube, a tube of uniform internal diameter; a differential manometer connected into said tube at two points distant from each other; a manometer connected into said tube midway between said points; a chart mounted adjacent the measuring leg of said differential manometer, said chart having thereon vertical lines numbered to correspond to the graduations on said intermediately connected manometer; and inclined lines corresponding to the quantities indicated by said differential manometer.

3. In a device for measuring the quantity of gases flowing, per unit of time, through a tube, a tube of uniform internal diameter; a differential manometer connected into said tube at two points distant from each other; a manometer connected into said tube midway between said points; a chart holder vertically adjustable adjacent the measuring leg of said differential manometer; and a chart mounted for horizontal adjustment in said chart holder, all substantially as described.

In testimony whereof I have affixed my signature.

THEODORE HORTON.